(12) United States Patent
Fritz et al.

(10) Patent No.: US 10,891,876 B2
(45) Date of Patent: Jan. 12, 2021

(54) DUMMY OBJECT WITH EXTREMITIES WHICH UTILIZE THE MASS INERTIA THEREOF TO REPLICATE A NATURAL MOVEMENT PROCESS

(71) Applicants: Martin Fritz, Kobenz (AT); Peter Josef Peyrer, Leoben (AT)

(72) Inventors: Martin Fritz, Kobenz (AT); Peter Josef Peyrer, Leoben (AT)

(73) Assignee: 4ActiveSystems GmbH, Traboch (AT)

( * ) Notice: Subject to any disclaimer, the term of this patent is extended or adjusted under 35 U.S.C. 154(b) by 470 days.

(21) Appl. No.: 15/843,908

(22) Filed: Dec. 15, 2017

(65) Prior Publication Data

US 2018/0158375 A1     Jun. 7, 2018

Related U.S. Application Data

(63) Continuation of application No. 14/399,895, filed as application No. PCT/EP2013/058994 on Apr. 30, 2013, now Pat. No. 9,870,722.

(30) Foreign Application Priority Data

May 7, 2012   (DE) .......................... 10 2012 207 567

(51) Int. Cl.
*G09B 23/32*        (2006.01)
*G01M 17/007*     (2006.01)
(Continued)

(52) U.S. Cl.
CPC ........... *G09B 23/32* (2013.01); *G01M 17/007* (2013.01); *G09B 9/006* (2013.01); *G09B 23/28* (2013.01); *G09B 23/30* (2013.01); *G09B 23/34* (2013.01)

(58) Field of Classification Search
None
See application file for complete search history.

(56) References Cited

U.S. PATENT DOCUMENTS

| 3,098,319 A | 7/1963 | Ellis |
| 3,425,154 A | 2/1969 | Lindsey et al. |

(Continued)

FOREIGN PATENT DOCUMENTS

| CN | 101978250 | 2/2011 |
| DE | 3901079 | 7/1990 |

(Continued)

OTHER PUBLICATIONS

International Search Report for PCT/EP2012/059203.
(Continued)

*Primary Examiner* — James B Hull
(74) *Attorney, Agent, or Firm* — Indiano Law Group, LLC; E. Victor Indiano; John T. Woods

(57) ABSTRACT

A dummy object is described which is particularly suitable for a functional testing of driver assistance systems for vehicles. The dummy object comprises a torso, at least one extremity-representing an arm or a leg, wherein the extremity includes a proximal extremity portion mounted in an articulated manner at the torso and a distal extremity portion mounted in an articulated manner at the proximal extremity portion, and at least one drive which is arranged in the torso and is designed to move the proximal extremity portion relative to the torso. The proximal extremity portion can be moved in such a manner that a movement of the distal extremity portion, which is correlated with the movement of the proximal extremity portion, can be created by utilizing the mass inertia of the associated distal extremity portion.

14 Claims, 3 Drawing Sheets

(51) Int. Cl.
*G09B 9/00* (2006.01)
*G09B 23/28* (2006.01)
*G09B 23/34* (2006.01)
*G09B 23/30* (2006.01)

(56) References Cited

U.S. PATENT DOCUMENTS

| | | | |
|---|---|---|---|
| 3,557,471 A | 1/1971 | Payne et al. | A63H 3/003 434/270 |
| 3,583,098 A | 6/1971 | Bear | |
| 5,224,896 A | 7/1993 | Terzian | |
| 6,120,343 A | 9/2000 | Migliorati et al. | |
| 9,355,576 B2 | 5/2016 | Fritz | |
| 9,870,722 B2 | 1/2018 | Fritz et al. | |
| 2005/0021180 A1 | 1/2005 | Kwon et al. | |
| 2005/0066705 A1 | 3/2005 | Choi | |
| 2005/0155441 A1 | 7/2005 | Nagata | |
| 2006/0075826 A1 | 4/2006 | Roberts et al. | |
| 2010/0078987 A1 | 4/2010 | Lubecki | |
| 2014/0102224 A1 | 4/2014 | Fritz | |
| 2015/0317917 A1 | 11/2015 | Fritz et al. | |
| 2016/0054199 A1 | 2/2016 | Fritz | |

FOREIGN PATENT DOCUMENTS

| | | |
|---|---|---|
| DE | 19802590 | 8/1999 |
| DE | 10 2007 024565 | 2/2008 |
| DE | 102008051233 | 5/2009 |
| DE | 102007035474 | 6/2009 |
| DE | 102008022546 | 11/2009 |
| DE | 102008025539 | 12/2009 |
| DE | 102008030208 | 12/2009 |
| DE | 102011012542 | 2/2011 |
| DE | 102011017146 | 10/2012 |
| EP | 0034862 | 9/1981 |
| EP | 1010919 | 12/1999 |
| EP | 1734352 | 12/2006 |
| EP | 2192567 | 11/2008 |
| FR | 2680902 | 5/1993 |
| IT | WO160474 | 8/2001 |
| JP | 2000-167259 | 6/2000 |
| JP | 2000-167259 | 6/2006 |
| JP | 2000-039686 | 2/2008 |
| JP | 2008-039686 | 2/2008 |
| WO | WO 01/60474 | 8/2001 |
| WO | WO 2006/078890 | 7/2006 |
| WO | WO 2009144199 | 5/2009 |
| WO | WO2009103518 | 8/2009 |
| WO | WO 2012/156484 | 11/2012 |
| WO | WO2012156484 | 11/2012 |

OTHER PUBLICATIONS

English Translation of Office Action of Japan Patent Office; dated Nov. 1, 2016.
Advanced crash avoidance Tachnologies Program—Final report of the Honda—DRI Team (Dot HS 811 454 A) Jun. 2011.
International Search Report for PCT/EP2013/058,994 (12 pages).
Cited References WO 2012/156484—Translation of DE 102008025539; DE 102007035474.
Translations of Abstracts of JP 2000-167259 and JP 2008-039686.

DUMMY OBJECT WITH EXTREMITIES WHICH UTILIZE THE MASS INERTIA THEREOF TO REPLICATE A NATURAL MOVEMENT PROCESS

PRIORITY STATEMENT

This application is a continuation of Fritz et al U.S. patent application Ser. No. 14/399,895, which was nationalized on and has a filing date of 12 Mar. 2015, which is a nationalization of PCT application no PCT/EP2013/058994, which was filed on 30 Apr. 2013; which claims the benefit of the filing date of, and priority to German Patent Application No. 10 2012 207 567.4 filed 7 May 2012, the disclosures of all of which are hereby incorporated herein by reference.

TECHNICAL FIELD

Embodiments of the present invention relate in general to the technical field of the improvement of road traffic safety by means of a simulation of traffic accidents and/or the testing of the function of driver assistance systems. Embodiments of the present invention relate in particular to a dummy object which can be used for simulated traffic accidents and/or for testing the function of driver assistance systems and which has at least a torso, movable arms and movable legs.

BACKGROUND OF THE INVENTION

To test the road safety of (motor) vehicles, it is known to simulate traffic accidents by means of special crash tests. In particular types of crash tests, a dummy object is situated inside a moved object, which represents a vehicle. The dummy object then represents the vehicle driver or the passenger of the vehicle. In other types of crash tests, a moved object, which represents a vehicle, strikes onto a dummy object. In this case, the dummy object represents for example a pedestrian or a cyclist who is moving at a usually lower speed compared to the vehicle.

Other approaches for improving road safety are based on so-called driver assistance systems, which are installed in motor vehicles. Such driver assistance systems have suitable sensor systems which are able to detect and identify the spatial environment of the (travelling) motor vehicle. Such driver assistance systems are intended to identify critical traffic situations and to warn the driver of the vehicle, so that accidents can be avoided. Furthermore, driver assistance systems can prevent or at least lessen the consequences of an accident, by activating in a manner adapted to the situation particular components of the vehicle, such as for example brakes, steering or airbags.

From US 2005/0155441 A1 a system is known for the simulation of collisions of a dummy object with a motor vehicle. The dummy object is suspended by means of cables at a rail system and can be moved transversely to the direction of travel of an approaching motor vehicle. The dummy object imitates a human body and comprises a head, a neck, a torso, and arms and legs.

In a reliable testing of the functional capability of driver assistance systems, it should be taken into consideration that the movement behavior for example of pedestrians in road traffic is, however, relatively complex, which in reality makes a detection and an identification of a pedestrian difficult. In this context, a differentiation can be basically made between three basic forms of movement: walking, running, and sprinting.

Walking is the basic form of movement which is to be encountered most frequently in road traffic. Here, one foot is always touching the ground, the respectively other foot is placed in front of the torso, the limbs are approximately extended and the upper body remains substantially straight.

In the running basic form of movement, both feet are briefly without contact with the ground and the step size is greater than when walking. One foot is generally placed directly under the torso, the upper body remains largely straight or is situated in a slightly forward position. The speed can be constant over a lengthy period of time, depending on the physical fitness of the person concerned. Running children, who are initially concealed by an object such as a parking vehicle for example, are encountered very frequently in road traffic.

In the third basic form of movement, sprinting, the speed can only be maintained over a relatively short period of time. Most of the time, both feet have no contact with the ground. A contact with the ground is brought about in that the respective foot is placed onto the ground under the torso with the ball of the foot. In addition, in the sprinting basic form of movement the step size is very large and the upper body shifts distinctly forward.

In active driver assistance systems which warn the vehicle occupants either about dangerous situations or which intervene independently in the driving process, it is necessary to test their functional capability by suitable methods using dummy objects. Test methods and dummy objects are necessary, which reproduce possible traffic situations in a manner as close to reality as possible.

On identifying a pedestrian, the detection process is usually carried out in two stages. In a first stage, the so-called initial detection, it is important that as far as possible all pedestrians in a relevant environmental area of the vehicle are detected. It is accepted here that objects are also detected erroneously as possible pedestrians. In the subsequent second stage, the so-called classification, the detected objects are classified as pedestrians or as non-pedestrians. For the classification, time-dependent features of the detected objects, such as for example leg movements, are used for the classification. If two-dimensional test objects, as are known for example from DE 10 2008 025 539 A1, are used as dummy objects, then for example in the recreation of a simple crossing over by a pedestrian the view angle of the dummy object on an approach of the vehicle can change by up to 60°. Here, a two-dimensional object would pass from a contour describing only the silhouette into approximately a line contour. This would lead to incorrect data in the development and testing of driver assistance systems. It is therefore important to construct dummy objects three-dimensionally and as similarly to humans as possible and to move them in a manner as close to reality as possible. Moreover, it is desired to construct a dummy object to be so robust that it can be used for a multiplicity of crash tests. Only in this way the costs for informative crash tests can be kept low. There may be a need to provide a dummy object which can be constructed and moved in a manner similar to a human and which has, in addition, a high degree of robustness or respectively stability, so that it can be used non-destructively for a multiplicity of realistic crash tests.

SUMMARY OF THE INVENTION

This need may be met by the subject matters of the independent claims. Advantageous embodiments of the present invention are described in the dependent claims.

According to a first aspect of the invention, a dummy object, in particular for the functional testing of driver assistance systems for vehicles, is described. The described dummy object comprises (a) a torso, (b) at least one extremity, which represents an arm or a leg, wherein the extremity comprises (b1) a proximal extremity portion, mounted in an articulated manner at the torso, and (b2) a distal extremity portion, mounted in an articulated manner at the proximal extremity portion, and (c) at least one drive which is arranged in the torso and which is designed to move the proximal extremity portion relative to the torso. In the described dummy object, the proximal extremity portion can be moved in such a manner that a movement of the distal extremity portion, which is correlated with the movement of the proximal extremity portion, can be created by utilizing the mass inertia of the associated distal extremity portion.

The dummy object described with the first aspect of the invention is based on the finding that a realistic movement of an entire extremity can already be realized by means of a single drive which drives the proximal extremity portion to a pivoting movement, and avoiding complex mechanical elements, which provide for a correlation between the (pivoting) movement of the proximal extremity portion and the (pivoting) movement of the distal extremity portion. The (pivoting) movement of the distal extremity portion is namely realized in the dummy object described here in that the mass inertia of the distal extremity portion, which can move freely apart from a more or less intensive friction at least in a central (pivoting) movement range, is utilized. Therefore, realistic movements of the distal extremity portion can also be replicated without a separate drive for the movement of the distal extremity portion and/or without a complex mechanical coupling (for example by means of toothed wheels, lever rods and/or a cable- and/or link guide) between the movements of the two extremity portions.

To produce a realistic movement of the entire extremity therefore, apart from a suitable articulated connection between the two extremity portions, merely a drive for the proximal extremity portion is necessary. This drive can be arranged in the torso, where, by contrast to the extremities, which furthermore are exposed in a crash test to particularly high mechanical stresses (in particular vibrations and/or high accelerations), good possibilities exist for protecting the drive from major mechanical stresses and damage.

The drive can be, for example, an electric drive which is supplied with electrical energy from an electrical energy source, for example a rechargeable battery (accumulator). Preferably, the electrical energy source can also be arranged in the torso, protected from mechanical vibrations and/or accelerations. Here, the drive and the energy source and if applicable also a control or respectively possible reception units can be cast in the torso in a protective capsule for example of synthetic resin. This capsule can then be enclosed by foam elements for example of expanded polyethylene (EPE) and/or of expanded polypropylene (EPP).

It is pointed out that the described dummy object preferably has not only one extremity, but two, three and in particular four extremities. In particular in the case of four extremities, a human being can be replicated realistically, wherein then two extremities represent the arms and the other two extremities represent the legs of a human being. In the case of several extremities, the dummy object can of course also comprise several drives, wherein the number of extremities and the number of drives are to be equal.

It is pointed out that in the case of a dummy object with four extremities and four drives, two, three or all four drives can be realized by means of one shared central drive. The two, three or four (decentralized) drives are then able to be coupled mechanically with the shared central drive. An individual movement of the respective proximal extremity portion can then be realized in that the respective decentralized drive is selectively connected in a mechanical manner to the central shared drive.

The term "extremity" in this document is to be understood to mean a leg or an arm of the dummy object replicating the human body. The term "proximal extremity portion" is consequently to be understood as the thigh or the upper arm of the dummy object. In a corresponding manner, the term "distal extremity portion" is to be understood as the lower leg or the forearm of the dummy object replicating the human body.

According to an exemplary embodiment of the invention, the dummy object comprises in addition a mechanical stop, which is associated with a joint between the proximal extremity portion and the associated distal extremity portion. This mechanical stop, which leads to an angle delimitation with respect to the pivoting movement of the distal extremity portion at the itself pivotable extremity portion, can be used so that the natural movement of the entire extremity can be replicated particularly well.

In particular, the mechanical stop can lead to the direction of the pivoting movement of the distal extremity portion automatically reversing upon reaching the mechanical stop, without any further mechanical actuating elements being required for this.

Preferably, the dummy object comprises in addition a further mechanical stop, which is likewise associated with the joint between the proximal extremity portion and the associated distal extremity portion. This further mechanical stop can also be utilized for a desired reversal of direction of the pivoting movement of the distal extremity portion upon reaching the further mechanical stop. Thereby, in a simple manner, the natural movement of the entire extremity can be replicated even better. Further actuating elements (mechanical and/or electrical) in the region of the connection between the proximal extremity portion and the distal extremity portion are not necessary here. Thereby, the high mechanical robustness of the described dummy object described above is not negatively impaired in any way.

If the proximal extremity portion is the thigh and the associated distal extremity portion is the lower leg, then the joint between these two extremity portions is the knee joint. In a corresponding manner, the joint between the proximal upper arm and the distal forearm is the elbow.

It is pointed out that preferably the two knee joints are equipped with the stop which is described here, or with the two stops which are described here, which automatically bring about an angle delimitation and a reversal of direction of the pivoting movement of the lower leg. As the region of the legs and in particular the region of the knee in realistic crash tests is exposed to a particularly high mechanical stress, the replication of the human walking movement based only on the inertia of the lower leg in connection with the at least one mechanical stop contributes to the dummy object described in this document being able to be realized by means of a particularly robust construction. However, it is evident that alternatively or in combination also the two elbow joints can be provided respectively with one or with two mechanical stops, in order to also increase the robustness of the dummy object in the upper part of the dummy object.

It is pointed out that in the case of a dummy object with several extremities, not all extremities have to be equipped with a mobility, which through utilization of the mass inertia of the distal extremity portion makes possible a natural replication of a human movement. In particular, at least one extremity, if required, can also be embodied so as to be rigid. Thereby, a predefined angularity for example of a stationary object can be replicated.

According to a further exemplary embodiment of the invention, the dummy object comprises in addition a holding mechanism, which is associated with the joint between the proximal extremity portion and the associated distal extremity portion and which is constructed in such a manner that after a reversal of direction caused by the mechanical stop and after a subsequent predetermined movement of the distal extremity portion in the reverse direction, a predetermined holding angle position is maintained between the proximal extremity portion and the distal extremity portion until a holding force of the holding mechanism is overcome by the inertia force of the distal extremity portion connected with a renewed reversal of direction.

Expressed in clear terms, the described holding mechanism can make provision that the angle position between the proximal extremity portion and the distal extremity portion after a direction reversal of the pivoting movement of the distal extremity portion remains temporarily in a predetermined angle position until this angle position is relinquished again by a (renewed) direction reversal of the pivoting movement of the proximal extremity portion and the inertia force connected therewith. It is necessary here to dimension the holding force of the holding mechanism so that in a usual movement process on the one hand the desired holding effect is achieved and on the other hand the distal extremity portion can release itself from its temporarily established angle position in relation to the proximal extremity portion precisely when it is necessary for a natural movement of the extremity in question.

The expression "predetermined movement" which is used can be understood in particular to the effect that the distal extremity portion moves about a predetermined pivoting angle. In particular in the embodiment described above with respectively two mechanical stops, the predetermined pivoting angle can be determined by the angular distance between two mechanical stops. This means that the predetermined movement of the distal extremity portion after its direction reversal extends over the entire available angle range. This facilitates on the one hand the mechanical construction of the joint in question and improves, on the other hand, the reproducibility of the movement process of the extremity in question.

It is pointed out that the holding mechanism described above is preferably provided respectively at the two legs of the dummy object or respectively at the two knee joints. The described holding mechanism can, however, also be provided alternatively or in combination at the two arms or respectively at the two elbow joints of the dummy object.

According to a further exemplary embodiment of the invention, the holding mechanism has a magnetic element. This has the advantage that the holding mechanism can operate at least approximately in a wear-free manner. Thereby, a long life of operation of the described dummy object can be achieved and/or maintenance intervals for the dummy object can be selected to be correspondingly long, without there being a concern about an unnatural movement process of the extremity in question.

The magnetic element can comprise a permanent magnetic material and can interact with a further magnetic element. Here, the two magnetic elements can touch each other when the holding mechanism is activated and the predetermined holding angle position exists between the proximal extremity portion and the distal extremity portion.

The described magnetic holding mechanism can be realized in a particularly simple manner by one of the two magnetic elements being arranged at the proximal extremity portion and the other of the two magnetic elements being arranged at the distal extremity portion.

The use of a magnetic element has the advantage that the holding mechanism can be realized simply and in a particularly compact structural shape. Here, furthermore, weight advantages can result, so that the entire dummy object can be realized in a particularly light construction.

The magnetic force can be adjusted in a simple manner by means of a three-dimensional adjustment of the relative position between the magnetic element and the further magnetic element, which interacts with the magnet. This preferably takes place when the holding mechanism is activated and the predetermined holding angle position between the proximal extremity portion and the distal extremity portion has been reached.

According to a further exemplary embodiment of the invention, the proximal extremity portion and the associated distal extremity portion are realized respectively by means of a sandwich structure which comprises two three-dimensional volume elements and a planar fiber-reinforced material, which is situated between the two three-dimensional volume elements.

Therefore, the extremities of the dummy object can also be realized in a simple manner as three-dimensional components, which enables a lifelike replication of a human body. The two three-dimensional volume elements can be glued (mechanically or in a thermally stable manner) to the planar fiber-reinforced material.

The planar fiber-reinforced material can comprise a thickness of for example 0.1 mm to 2 mm. The plane along which the planar fiber-reinforced material extends is preferably oriented parallel to the plane within which the pivoting movements of the proximal extremity portion in question and of the distal extremity portion in question take place. Put in other words, the axes of the pivoting movements in question are oriented perpendicular with respect to the surface of this plane.

The planar fiber-reinforced material, compared with the material of the three-dimensional volume elements, typically comprises a distinctly larger stiffness. This also applies in consideration of the distinctly larger thicknesses of the three-dimensional volume elements compared to the thickness of the planar fiber-reinforced material. This can advantageously produce a high degree of flexibility of the two extremity portions about an axis which runs within or parallel to the above-mentioned plane. Consequently, the two extremity portions can bend along a direction particularly well and preferably elastically, which direction occurs in deflections which take place in the case of a lateral impact of a vehicle onto the extremity in question of the described dummy object. Thereby, with the described dummy object crash tests can be carried out particularly well, which simulate for example a lateral impact of a vehicle onto a pedestrian.

The fibers of the fiber-reinforced material can be, in particular, synthetic fibers such as for example polyamide, aramid, polyethylene, polypropylene or polyester fibers. The three-dimensional volume parts can be shaped parts of expanded polyethylene (EPE) and/or of expanded polypropylene (EPP) and can be dimensioned so that replications of the corresponding human extremities are produced which are as realistic as possible. Polyurethane (PU)-, polystyrene (EPS)- and/or polyethylene terephthalate (PET)-foam can be used, in order to produce the three-dimensional volume parts. The three-dimensional volume parts of EPE, EPP, PU or PET can be realized in the form of block-foamed and/or cut sheets.

The use of the described sandwich structure can be advantageous in particular when the dummy object is to be used without great changes to its size at different temperatures. The fibers of the fiber-reinforced material can namely make provision that the thermal expansion of the extremity portion in question is also small when the material of the three-dimensional volume elements has a greater coefficient of thermal expansion. Owing to its particularly high degree of stiffness and the small thermal expansion, the fiber-reinforced material will then make provision that (with a fixed planar connection between the planar fiber-reinforced material and the adjoining three-dimensional volume element) the three-dimensional volume element is situated in a compressed state along the plane of the planar fiber-reinforced material. This applies in particular to the above-mentioned synthetic fibers which, owing to their great stiffness and their low coefficient of thermal expansion, keep the length of the extremity portions largely constant even in the case of large temperature changes.

The sandwich structure is preferably symmetrical with respect to the central planar fiber-reinforced material. This can mean in particular that the two adjoining three-dimensional volume elements have an equal thickness. The "thermal focus" and the "elastic focus" are to come to lie in the plane of the fiber-reinforced material. This has the advantage namely that in the case of a temperature change, even with greatly different coefficients of thermal expansion of the planar fiber-reinforced material compared to the material of the adjoining three-dimensional volume elements a deflection of the corresponding extremity portion does not occur.

It is pointed out that other parts of the described dummy object can also be realized by means of suitable sandwich structures. In particular in the case of wider body parts, such as e.g. the head or the torso it is possible, furthermore, to use a sandwich structure consisting of several layers. It applies here preferably that the number of layers which are formed by three-dimensional volume parts is greater by one than the number of planar fiber-reinforced materials.

According to a further exemplary embodiment of the invention, the planar fiber-reinforced material of the proximal extremity portion forms an overlap with the planar fiber-reinforced material of the distal extremity portion, wherein the two planar fiber-reinforced materials are connected with one another in the associated overlapping region by means of a rotary connection. Thereby, a human joint (knee joint or elbow joint) can be replicated between the two extremity portions in a particularly simple manner. The rotary connection can be realized for example by means of a bolt or a pin, wherein at least one of the two planar fiber-reinforced materials can rotate about this bolt or pin, respectively. The bolt or respectively the pin represents here the rotation axis for the resulting pivoting movement of the distal extremity portion relative to the proximal extremity portion.

In the described construction of the joint between the two extremity portions, owing to the overlap the planar fiber-reinforced material extends along the entire length of the extremity in question, whereas the three-dimensional volume elements do not extend of over the entire length of the extremity portion in question. Rather, two three-dimensional volume elements are situated at each side of the planar fiber-reinforced material, wherein one is associated with the proximal extremity portion and the other is associated with the distal extremity portion. In other words, the three-dimensional volume elements are interrupted in the vicinity of the joint.

This has the advantage that the extremity at the site of the joint can buckle particularly easily upon a lateral impact of a vehicle in a crash test, without the mechanical combination of the entire extremity being damaged. The region of the joint forms namely a preferred buckling site, which enables a reversible lateral buckling of the extremity. This preferred buckling site is of great advantage in particular in a leg of the dummy object, because most collisions between a vehicle and a dummy object simulating a pedestrian occur or respectively begin at the height of the knee joint. By means of the described construction of the joint, therefore, the robustness of the dummy object can be distinctly improved in a simple manner.

According to a further exemplary embodiment of the invention, the overlap is situated in a proximal section of the distal extremity portion. Thereby, the movement process of a human arm and in particular of a human leg can be replicated particularly realistically.

According to a further exemplary embodiment of the invention, the planar fiber-reinforced material of one of the two extremity portions comprises two end face sections in the region of the overlap, wherein the planar fiber-reinforced material of the other of the two extremity portions is arranged between the two end face sections. This may mean in particular that the planar fiber-reinforced material of the one extremity portion is split in the region of the overlap between a real or virtual cut along the plane of the planar fiber-reinforced material, wherein the two resulting end face sections together with the planar fiber-reinforced material of the other of the two extremity portions form a sandwich structure. The rotary connection preferably extends here over both end face sections, so that not only the two extremity portions but also the joint present a symmetrical construction which has a distinctly greater mechanical robustness compared to an unsymmetrical construction in which only two single-piece planar fiber-reinforced materials overlap.

According to a further exemplary embodiment of the invention, the dummy object comprises in addition (a) a form-fitting connection, which connects the proximal extremity portion in a torque-proof manner with a rotor of the drive, wherein the form-fitting connection is nor able to receive a tractive force and/or a bending moment along the rotation axis of the drive, and (b) an elastic traction device, which engages at the proximal extremity portion and draws this towards the torso.

By means of the elastic traction device, which can be, for example, an elastic belt, a rubber expander and/or an elastic cable, provision is made that in a normal state of the dummy object (i.e. when no impact is currently taking place), the form-fitting connection (receiving no tractive force and/or no bending moment) is maintained. By means of a suitable activation of the drive in question the proximal extremity portion and if applicable also with the use of the mass inertia (as described above) the corresponding distal extremity portion can then be moved. If, however, owing to an impact of a vehicle object onto the dummy object greater forces or moments act on the extremity portion in question, the elastic traction device can yield and the form-fitting connection, which itself is nor able to receive any tractive forces and/or bending moments, is released. Thereby, directly after the impact the extremity in question can move largely freely relative to the torso, wherein a cohesion between the extremity and the torso is brought about substantially by the elastic traction device and if applicable also by a cover of the dummy object. Thereby, damage to the dummy object and in particular damage to the articulated connections between the proximal extremities and to the torso can be prevented and hence the robustness of the dummy object can be further increased.

According to a further exemplary embodiment of the invention, the dummy object comprises in addition (a) at least one further extremity, which represents an arm or a leg, wherein the further extremity also has (a1) a proximal extremity portion, mounted in an articulated manner at the torso, and (a2) a distal extremity portion, mounted in an articulated manner at the proximal extremity portion, and (b) at least one further form-fitting connection, which connects the proximal extremity portion of the further extremity in a torque-proof manner with a rotor of the further drive, wherein the further form-fitting connection is not able to receive a tractive force and/or no bending moment along the rotation axis of the further drive. The elastic traction device connects here two proximal extremity portions of the dummy object of the same kind with one another such that the two proximal extremity portions of the dummy object of the same kind are drawn against one another.

The term "extremity portions of the dummy object of the same kind" is to be understood to mean in this context, apart from a possibly present left/right asymmetry, anatomically identical body parts. This means that the two proximal extremity portions, which respectively represent an upper arm of the dummy object, are identical. In a corresponding manner, also the two proximal extremity portions, which respectively represent a thigh of the dummy object, are identical.

A form-fitting connection in the sense of the exemplary embodiment described here and previously can be realized in particular by means of two connecting elements which are complementary to one another with regard to their three-dimensional contour. Here, one of the two connecting elements is associated with the torso and is connected (in a torque-proof manner) with a rotor of the corresponding drive. The other one of the two connecting elements is associated with the corresponding proximal extremity portion. A connecting element can be realized for example by means of a square or a truncated pyramid.

Preferably, the dummy object comprises the elastic traction device in the region of the hips of the dummy object, because here in crash tests the greatest mechanical stresses of the dummy object occur. Here, the two thighs (from different sides) are pressed against the torso. Alternatively or in combination, the dummy object has a further elastic traction device in the region of the hips of the dummy object, which presses the two upper arms against the torso, so that the robustness of the dummy object is further increased.

According to a further exemplary embodiment of the invention, the dummy object has in addition a (flexible and/or tear-resistant) cover, which surrounds at least the torso and the at least one extremity. The cover can be produced for example from a material which encloses the dummy object in a similar manner to clothing encloses the human torso, for example a pedestrian. The material can be waterproof, so that crash tests can also be carried out with the dummy object under extreme weather conditions.

The cover can advantageously contribute to securely holding the extremities of the dummy object on the torso in a flexible or articulated manner on the torso in the case of an impact. Thereby, in a simple manner, a tearing of the dummy object and in particular a separation of at least one extremity can be prevented in the case of an impact.

The cover can be embodied in several parts, in particular of trousers and top, or in one piece, analogous to an overall. If applicable, replications of shoes and/or gloves can be provided on the cover or respectively overall, so that a human body is replicated even more realistically.

The cover can be inflatable, at least in partial regions. Thereby, if required, in the case of a low weight of the entire dummy object, human torso parts can be replicated even more realistically.

According to a further exemplary embodiment of the invention, the cover has surface regions which replicate the surface of a human body, in particular the surface of a clothed human body, with regard their physical noticeability.

The cover can have, for example, a coating so that the described dummy object is detected in at least a similar manner to a real human being in road traffic by sensor systems of a driver assistance system which is to be tested. Here, the surface region can be a coating which has a similar absorption- or respectively reflection behavior to a real human being with regard to electromagnetic radiation or sound. The electromagnetic radiation can be electromagnetic waves in an arbitrary wavelength range, wherein the wavelength range(s) are preferably coordinated to the sensitivity of the sensor systems of the driver assistance system which is to be tested.

Depending on the sensor systems which are used, for example ultraviolet light, visible light, infrared light, radio waves and/or radar waves can be used for detecting the dummy object, and the type of coating can be adapted accordingly.

The cover can comprise, in addition, electrically heatable mats, for example resistance heating mats. These can be heated such that the temperature of the heatable mat corresponds to the surface temperature of the skin of a real human being, which skin is not covered by clothing. Thus, for example, at the sites of the distal extremity portions (forearms, lower legs) electrically heatable mats can be arranged, in order to permit a detection of the foot- and/or hand parts of the dummy object as in a real human being with the use of suitable infrared camera systems. In a corresponding manner, a head part of the cover can be heated, in order to also make the head of the dummy object visible by means of an infrared camera system.

The outer side of the cover can be provided with a skin-colored natural rubber or silicone in the region of the exterior of the head and/or in the region of the distal extremity portions.

According to a further exemplary embodiment of the invention, the dummy object has in addition a connecting device which is rigidly connected to the torso and which is arranged to fasten the dummy object mechanically to a connecting element of an external movement system, by means of which the dummy object is able to be moved.

The connecting device can be, for example, a rod which extends starting from the torso up to a position being located above a head of the dummy object. The connection of the dummy object to the connecting element can take place in particular by means of a detachable connection which can be easily activated by an operator. The connection can take place for example by means of a screw connection, a clamp connection, a bayonet closure, a magnetic connection or similar. Preferably, the connecting device is constructed such that the dummy object can be coupled to different movement systems.

The movement system can be, in particular, a part of an installation for carrying out crash tests and/or for testing driver assistance systems. The movement system within such an installation can enable in particular a controlled and reproducible movement of the dummy object.

The movement system can have, for example, a rail system or the like, wherein the dummy object is held and moved by the movement for example of a traveling trolley. In addition to the connecting device described above, the dummy object can also be held or respectively moved, if required, by additional cables, for example of aramid fibers, PP fibers or PE fibers.

The movement system can also have a frame positionable on a rail system, a traveling platform arranged on the ground or a carriage which can be moved automatically for example using a track- or cable system.

Preferably, the mechanical connection of the dummy object to the movement system takes place by means of rod(s), cable(s) and/or other elements in as visually inconspicuous manner as possible. In particular, the corresponding mechanical connecting elements can therefore have a small cross-section. Furthermore, these connecting elements can be produced from a "radar-invisible" material. Thereby, measurements which are carried out by a driver assistance system are impaired as little as possible.

It is pointed out that by additional cables, which brace the dummy object with the movement system, oscillations of the dummy object can also be prevented or at least damped. Thereby, the influence of environmental conditions such as wind, for example, can be largely prevented.

According to a further exemplary embodiment of the invention, the dummy object comprises in addition (a) a control unit for controlling the operation of the at least one drive and (b) a wireless receiver device for receiving signals which are indicative for the operation of the at least one drive. Thereby, the movement of the respective extremity of the dummy object can be controlled from the exterior for example via a radio connection. Thus, for example, the speed of walking, running and/or sprinting of the dummy object can be adjusted in a remote-controlled manner.

According to a further aspect of the invention, there is described a dummy object, in particular for functional testing of driver assistance systems for vehicles. The described dummy object comprises (a) a torso, (b) at least one extremity, which represents an arm or a leg, wherein the extremity comprises (b1) a proximal extremity portion mounted in an articulated manner at the torso, and (b2) a distal extremity portion mounted in an articulated manner at the proximal extremity portion, and (c) at least one drive, which is arranged in the torso and which is designed in order to move the proximal extremity portion relative to the torso. In the described dummy object, the proximal extremity portion and the associated distal extremity portion is respectively realized by means of a sandwich structure, which has two three-dimensional volume elements and a planar fiber-reinforced material, which is situated between the two three-dimensional volume elements. In addition, the planar fiber-reinforced material of the proximal extremity portion forms an overlap with the planar fiber-reinforced material of the distal extremity portion, wherein the two planar fiber-reinforced materials in the associated overlap region are connected with one another by means of a rotary connection.

The dummy object described by this further aspect of the invention is based on the finding that by an interruption of the two three-dimensional volume elements present in the region of a joint between the proximal extremity portion and the distal extremity portion with a simultaneous interruption-free passage of the two planar fiber-reinforced materials overlapping with one another along the entire length of the respective extremity, a human joint (knee joint or elbow joint) can be replicated between the two extremity portions in a particularly simple manner. This has the advantage that the extremity at the site of the joint can buckle particularly easily in the case of a lateral impact of a vehicle within a crash test, without the mechanical combination of the entire extremity being permanently damaged. The region of the joint namely forms a preferred buckling site, which enables a reversible lateral buckling of the extremity. The cohesive planar fiber-reinforced material holds the two extremity portions together here so that the dummy object can also have a high mechanical robustness at its sensitive sites.

According to a further aspect of the invention, a dummy object in particular for a functional testing of driver assistance systems for vehicles is described. This dummy object comprises (a) a torso, (b) at least one extremity, which represents an arm or a leg, wherein the extremity comprises (b1) a proximal extremity portion mounted in an articulated manner at the torso, and (b2) a distal extremity portion mounted in an articulated manner at the proximal extremity portion, and (c) at least one drive which is arranged in the torso and which is designed in order to move the proximal extremity portion relative to the torso. This dummy object comprises in addition (d) a form-fitting connection, which connects the proximal extremity portion in a torque-proof manner with a rotor of the drive, wherein the form-fitting connection is not able to receive a tractive force and/or a bending moment along the rotation axis of the drive, and (e) an elastic traction device, which engages at the proximal extremity portion and draws the latter against the torso.

Preferably in this dummy object, two extremity portions of the same kind are connected respectively by means of a form-fitting connection in a torque-proof manner with a rotor of the respective drive, wherein both form-fitting connections are not able to receive a tractive force and/or a bending moment along the rotation axis of the respective drive. In addition, the two identical extremity portions of the dummy object are connected with one another by means of an elastic traction device, such as for example an elastomer band and/or an expander cable, such that the two identical extremity portions of the dummy object are drawn against one another.

The dummy object described with this further aspect of the invention is based on the finding that the robustness of the dummy object can be improved with respect to the connection of the proximal extremity portions to the torso by a detachable connection. Here, the respective extremity portion or preferably the two extremity portions of the dummy object of the same kind are pressed against the torso owing to the tractive force exerted by the elastic traction device, so that in a normal state of the dummy object (i.e. when no impact is currently taking place) the form-fitting connection (receiving no tractive force) is maintained. By means of a suitable activation of the drive in question, the proximal extremity portion and if applicable also with the use of mass inertia (as described above) the corresponding distal extremity portion can then be moved. If, however, owing to an impact of a vehicle object onto the dummy object, larger forces or moments act on the extremity portion in question, the elastic traction device can yield and the form-fitting connection, which itself is not able to receive any tractive forces, is released. Thereby, directly after the impact, the extremity in question can move largely freely relative to the torso, wherein the connection between the extremity and the torso is brought about substantially by the elastic traction device and if applicable also by a cover of the dummy object. Thereby, damage to the dummy object and in particular damage to the articulated connections between the proximal extremities and the torso can be prevented and hence the robustness of the dummy object can be further increased.

It is pointed out that embodiments of the invention have been described with reference to different aspects of the invention. However, it will become clear immediately to the person skilled in the art upon reading this application that, unless indicated explicitly otherwise, in addition to a combination of features which belong to an aspect of the invention, any desired combination of features which belong to different aspects of the invention is also possible.

Further advantages and features of embodiments of the present invention will emerge from the following description, by way of example, of currently preferred embodiments.

DETAILED DESCRIPTION

It is pointed out that features or components of different embodiments which are identical or at least functionally identical to the corresponding features or respectively components according to the respective embodiment, are provided with identical reference numbers or are provided with reference numbers which merely differ in the first number from the reference number of the identical or at least functionally identical features or respectively components. To avoid unnecessary repetitions, features or components already explained by means of a previously described embodiment are not explained in further detail at a later point.

In addition, it is pointed out that the embodiments described below represent merely a limited selection of possible design variants of embodiments of the invention. In particular, it is possible to combine the features of individual embodiments with one another in a suitable manner, so that with the design variants illustrated explicitly here, a plurality of different embodiments are to be regarded as clearly disclosed for the person skilled in the art.

Figure 1:
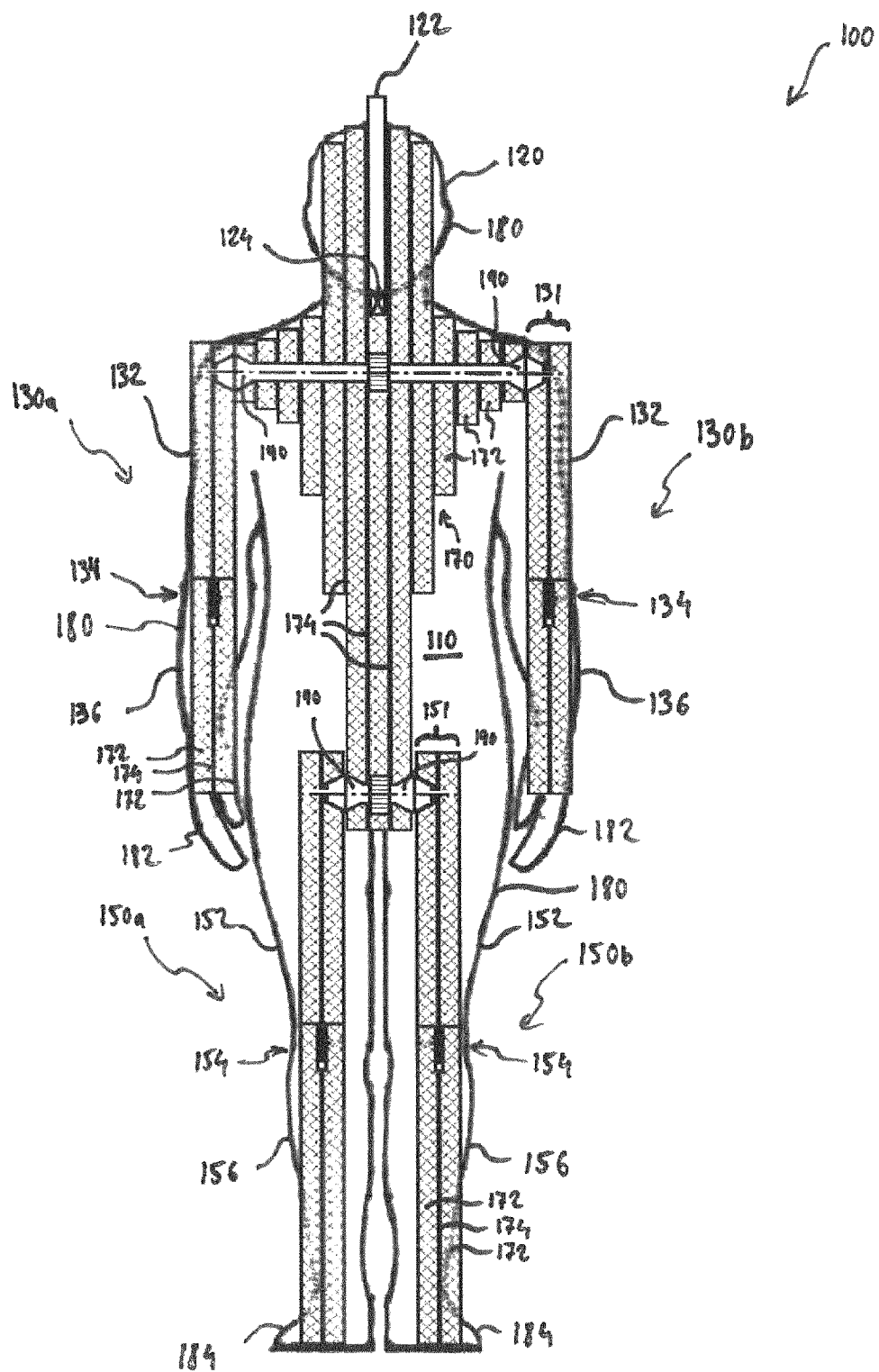
FIG. 1 shows in a sectional illustration a dummy object composed of a plurality of sandwich structures.

FIG. 1 shows a dummy object 100 according to a preferred exemplary embodiment of the invention. The dummy object 100 comprises a torso 120, a head 120 rigidly connected with the torso, and four extremities. The extremities are a left arm 130a, a right arm 130b, a left leg 150a, and a right leg 150b.

At the head 120 a connecting device 122, constructed as a tube, is situated, which represents an interface to an external movement system not illustrated in the drawing. The movement system can be, in particular, a part of an installation for carrying out crash tests and/or for testing driver assistance systems. The movement system can make provision within such an installation that the dummy object 100 moves in a controlled and reproducible manner.

According to the exemplary embodiment illustrated here, the connecting device 122 comprises a magnet 124, which can engage on a magnetic element of a moved part (for example a traveling trolley) of the external movement system which is not illustrated. The magnet and the magnetic element are magnetically so powerful that they are able to carry the dead weight of the entire dummy object 100.

All torso parts of the dummy object 100 have respectively a sandwich structure 131, 151, 170 formed in a suitable manner. Depending on the width of the respective torso part, the sandwich structure consists of one or more planar fiber-reinforced materials 174 and respectively two three-dimensional volume elements 172 arranged at both sides of the planar fiber-reinforced material 174 by means of suitable adhesive connections.

According to the exemplary embodiment illustrated here, the planar fiber-reinforced materials are fabric-reinforced sheets 174. The three-dimensional volume elements 172 are plates of extruded or block-foamed EPE or EPP. As can be seen from FIG. 1, according to the exemplary embodiment illustrated here, each one of the extremities 130a, 130b, 150a and 150b comprises a simple sandwich structure 131 or 151, respectively, with respectively a fabric-reinforced sheet 174. The torso 110 comprises in particular in the upper part a multiple sandwich structure with several fabric-reinforced sheets 176.

As can be seen from FIG. 1, the two arms 130a and 130b have respectively a proximal extremity portion 132, which represents an upper arm of the dummy object 100, and a distal extremity portion 136, which represents a forearm of the dummy object 100. An (elbow) joint 134 is formed between the upper arm 132 and the forearm 136.

In a corresponding manner, the two legs 150a and 150b have respectively a proximal extremity portion 152, which represents a thigh of the dummy object 100, and a distal extremity portion 156, which represents a lower leg of the dummy object 100. A (knee) joint 154 is formed between the thigh 152 and the lower leg 156.

The dummy object 100 has furthermore a total of four electric drives 190, wherein two drives 190 are associated with the shoulder region of the dummy object 100 and two drives 190 are associated with the hip region of the dummy object 100. Expressed in more precise terms, one drive is associated respectively to a proximal extremity portion 132, 152 and can move the respective proximal extremity portion 132 or respectively 152 relative to the torso 110, such that it carries out a pivoting movement in a plane perpendicularly to the plane of the drawing of FIG. 1. According to the exemplary embodiment illustrated here, the individual electric drives 190 can be actuated independently of one another, so that as a result each proximal extremity portion 132, 152 can be moved independently of the other proximal extremity portions 132, 152.

It is pointed out that embodiments of the dummy object can also exist, in which not all extremities can be moved. In this case, of course also the corresponding electric drive can be dispensed with. If applicable, the proximal extremity portions in question can be secured or arrested at different angle- or respectively pivot positions relative to the torso.

As has already mentioned, according to the exemplary embodiment illustrated here, all extremity portions 132, 136, 152, and 156 have respectively two EPE or EPP plates 172, between which, fixed by means of an adhesive connection respectively, the fabric-reinforced sheet 174 is situated. The fabric-reinforced sheet 174 constitutes a mechanical reinforcement. In the region of the joints 134 and 154 the fabric-reinforced sheet 174 projects out from one of the two extremity portions and into the other of the two extremity portions, so that an overlap is produced between the two fabric-reinforced sheets 174. The precise nature of realizing the joints 134 and 154 is explained in further detail below for the knee joint 154 with the aid of FIG. 3.

In order to be able to replicate a human body as realistically as possible, the dummy object has in addition a cover 180, constructed as an overall, on which two gloves 182 are mounted in the region of the hands and two shoes 184 are mounted in the region of the feet.

According to the exemplary embodiment illustrated here, the overall 180 is inflatable at least in some partial regions. Thereby, in the case of a low weight of the entire dummy object, human body parts can be replicated in a particularly realistic manner.

According to the illustrated exemplary embodiment, the overall 180 has a coating at least in partial regions, so that the dummy object 100 can be detected in at least a similar manner to a real human being in road traffic by sensor systems of a driver assistance system which is to be tested. In addition, at least some partial regions of the overall 180 can be heated for example with the use of electrically heatable mats, so that the temperature of the overall 180 corresponds to the surface temperature of the skin of a real human being, which skin is not covered by clothing.

Figure 2:
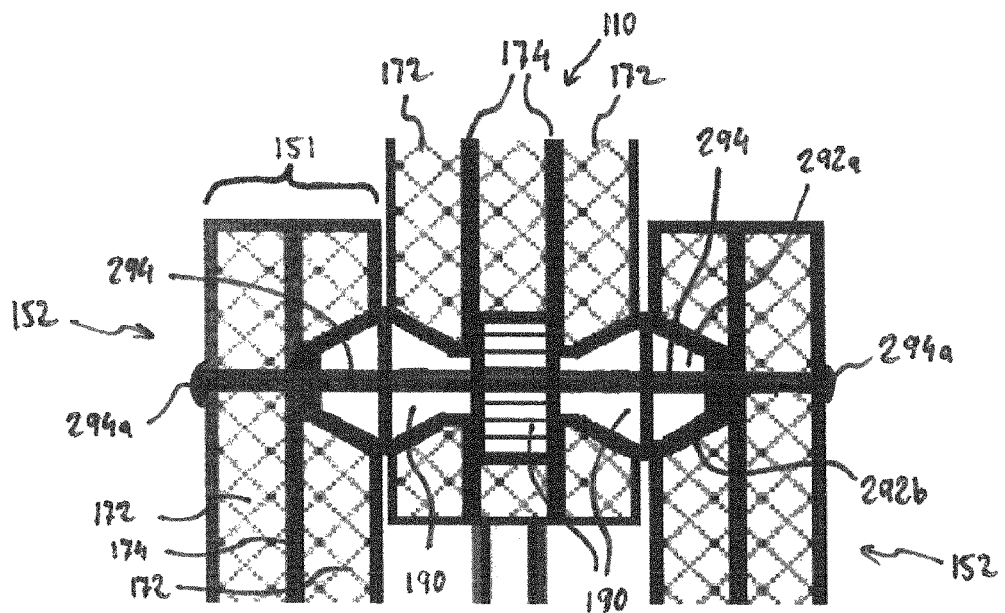
FIG. 2 shows an enlarged view of the hip region of the dummy object illustrated in FIG. 1.

FIG. 2 shows an enlarged view of the hip region of the dummy object 100. The thighs 152 are connected respectively by means of a form-fitting connection with one of the drives 190. The form-fitting connections are realized respectively by means of two connecting elements 292a and 292b, which engage into one another in a normal state. According to the exemplary embodiment illustrated here, the connecting element 292a, which is connected with the drive, is a truncated pyramid. The other connecting element 292b, which is anchored in the sandwich structure 151, is a recess, the three-dimensional surface of which is complementary to the truncated pyramid. It is pointed out that also other geometries, such as for example a square or a polygon structure can be used, in order to realize the form-fitting connections.

The form-fitting connections can only transfer torques which lead to a pivoting movement of the thigh 152 in question in a plane perpendicularly to the plane of the drawing. The form-fitting connections are not able to receive a tensile load. In order to nevertheless ensure a form-fitting connection between the two connecting elements 292a and 292b in the normal state (i.e. up to shortly before an impact) of the dummy object, an elastic traction device 294, constructed as an elastic tension belt, is provided, which is braced between the two thighs 152. According to the exemplary embodiment illustrated here, two widened end pieces 294a of the elastic tension belt 294 make provision that the latter is mounted reliably at the two thighs 152.

In the case of a transverse stress, which can occur in particular with an impact of a vehicle onto the dummy object, simulating a pedestrian accident, the tension force of the elastic tension belt 294 can be overcome and the form-fitting connection between the two connecting elements 292a and 292b is opened. Here, owing to the still present traction effect through the elastic tension belt 292 the two legs (and in a corresponding manner also the two arms) remain hanging on the torso of the dummy object.

Figure 3:
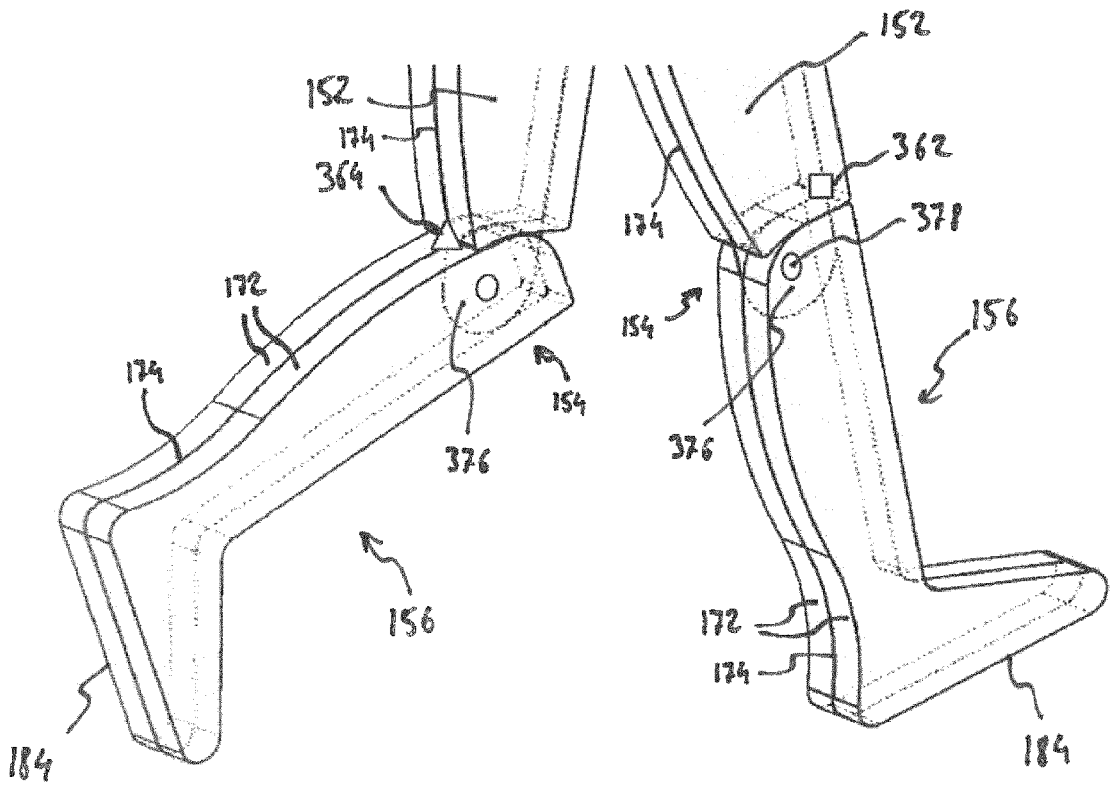
FIG. 3 shows the structure of a knee joint by means of an overlap between two planar fiber-reinforced materials, wherein a rotary connection is formed in the region of the overlap.

FIG. 3 shows the structure of a knee joint 154 by means of an overlap 376 between two fabric-reinforced sheets 174. According to the exemplary embodiment illustrated here, the fabric-reinforced sheet 174 of the proximal extremity portion (thigh) 152 projects out therefrom and between the two three-dimensional volume elements 172 of the distal extremity portion (lower leg) 156 into this. In the region of the overlap, the knee joint 154 is realized in that a rotary connection 378 is produced by means of a pin 378 which forms the axis of the knee joint 154.

According to the exemplary embodiment illustrated here, the fabric-reinforced sheet 174 of the thigh 152 has two end-face sections in the region of the overlap 376, wherein the fabric-reinforced sheet 174 of the lower leg 156 is arranged between the two end-face sections. Therefore, in the region of the overlap 376 the two end-face sections of the sheet 174 of the thigh 152 and the sheet 174 of the lower leg 156 form a sandwich structure and make provision that not only the two extremity portions themselves, but also the joint 154 is realized by means of a symmetrical and therefore particularly robust mechanical construction.

It is pointed out that of course the fabric-reinforced sheet 174 of the lower leg 156 can also have two end-face sections in the region of the overlap 376, between which end-face sections the fabric-reinforced sheet 174 of the thigh 152 projects.

In order to delimit the angle range of the pivoting movement between the thigh 152 and the associated lower leg 156, two mechanical stops, a front stop 362 and a rear stop 364, are provided in each knee joint 154. In FIG. 3, for reasons of clarity, only the stops which are active in the position which is shown are illustrated.

FIG. 4a to 4e illustrates a realistic movement process of the lower extremities (legs) of a dummy object according to an exemplary embodiment of the present invention. Here, the pivoting movements of the proximal extremity portions (thighs) are brought about respectively by an electric drive which is not illustrated. The distal extremity portions (lower legs) are induced to perform pivoting movements using their mass inertia, which movements are correlated with the pivoting movement of the respectively associated proximal extremity portion (thigh) such that an at least approximately natural movement process is produced.

In FIGS. 4a to 4e, the circles represent respectively the (identical) rotation axis of the two hip joints and the (different) rotation axes of the two knee joints.

The squares represent a front mechanical stop, which provides for a front angle limit of the pivoting movement between thigh and lower leg. The triangles represent a rear mechanical stop, which provides for a rear angle limit of the pivoting movement between thigh and lower leg. For reasons of clarity, only the mechanical stops which are active in the respectively shown position, i.e. which provide for an angle limit of the pivoting movement, are illustrated.

Figure 4A:
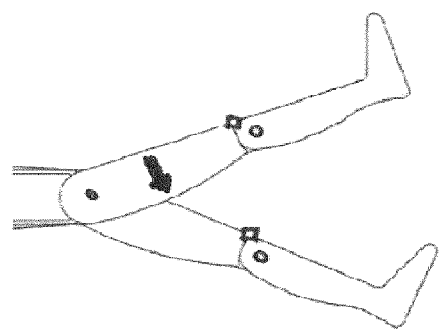
FIG. 4a to 4e illustrates a realistic movement process of the lower extremities (legs) of a dummy object, wherein pivoting movements of the proximal extremity portions (thighs) of respectively one drive are brought about, and the distal extremity portions (lower legs) are induced to pivoting movements using their mass inertia, which are correlated with the pivoting movement of the respectively associated proximal extremity portion (thigh).
Figure 4B:
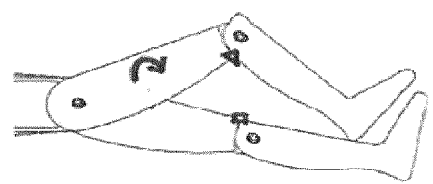
Figure 4C:
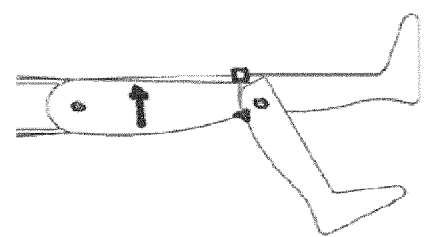
Figure 4D:
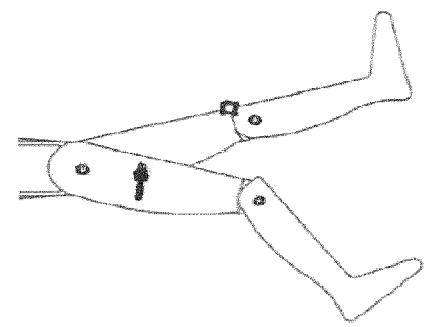
Figure 4E:
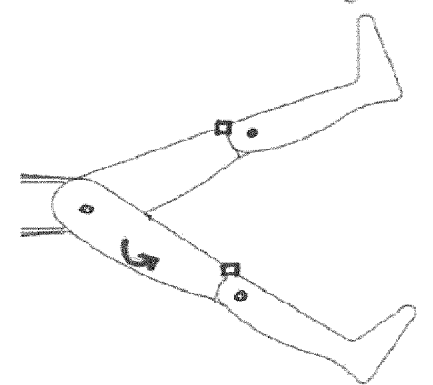

The three straight arrows in FIGS. 4b, 4c and 4e illustrate in each phase of the movement the movement direction of the respective thigh. The two bent arrows in FIGS. 4a and 4d illustrate an inversion of direction of the thigh.

As has already explained above, to realize the illustrated movement process, solely the thighs are driven actively. At the knee joint there is respectively a front and rear angle limit, which is brought about by a front or respectively a rear mechanical stop. With the angular acceleration at the inversion of direction of the thighs (see FIGS. 4a and 4d), the lower legs are moved by their mass inertia to the opposite angle limit. In order to ensure a pausing in this position, a magnet holder, which is not illustrated separately, is mounted at the angle limits. The magnet holder is dimensioned with regard to its magnetic force so that after an inversion of direction and the carrying out of a pivoting movement up to the opposite mechanical stop, the lower leg pauses at the magnet holder of the opposite mechanical stop until, with a renewed inversion of direction of the thigh, the mass inertia of the lower leg makes provision that the magnetic force is overcome and the lower leg can move freely again up to the opposite mechanical stop, where the angle position is then temporarily held again for a certain time by the other magnet holder.

It is pointed out that the principle of utilizing the mass inertia of the lower legs to achieve a natural movement process illustrated with the aid of FIGS. 4a to 4e can also be applied in a corresponding manner for an efficient presentation of a natural movement process of the arms, wherein in an analogous manner, only the upper arm is then driven by an electric drive.

REFERENCE NUMBERS 100 dummy object
110 torso
120 head
122 connecting device/column/tube
124 magnet
130a/b extremity/arm
131 sandwich structure
132 proximal extremity portion/upper arm
134 joint/elbow joint
136 distal extremity portion/forearm
150a/b extremity/leg
151 sandwich structure
152 proximal extremity portion/thigh
154 joint/knee joint
156 distal extremity portion/lower leg
170 sandwich structure
172 three-dimensional volume element
174 planar fiber-reinforced material/fabric-reinforced sheet
180 cover/overall
182 gloves
184 shoes
190 drives
292a connecting element
292b connecting element
294 elastic traction device/elastic tension belt
294a widened end piece
362 front stop
364 rear stop
376 overlap
378 rotary connection/pin

The invention claimed is:

1. A dummy object, comprising
   a torso;
   at least one extremity, the extremity representing an arm or a leg, wherein the extremity comprises a proximal extremity portion and a distal extremity portion, and wherein a first end of the proximal extremity portion is coupled at the torso in an articulated manner;
   a joint coupling the distal extremity portion with a second end of the proximal extremity portion;
   a first mechanical stop associated with the joint, wherein the first mechanical stop is structured to limit movement of the distal extremity portion relative the proximal extremity portion;
   at least one drive, which is arranged in the torso and is drivingly coupled to the proximal extremity portion, wherein the at least one drive is structured to selectively exert a force on the proximal extremity portion, thereby moving the proximal extremity portion relative to the torso, and wherein movement of the proximal extremity portion results in the creation of a mass inertia at the distal extremity portion; and
   wherein the mass inertia propels the distal extremity portion.

2. The dummy object as set forth in claim 1, further comprising a second mechanical stop structured to limit the movement of the distal extremity portion relative the proximal extremity portion;
   wherein the first mechanical stop provides a rear angle limit to the joint, wherein the second mechanical stop further provides a forward angle limit to the joint; and.

3. The dummy object as set forth in claim 2, further comprising a holding mechanism, which is associated with the joint between the proximal extremity portion and the distal extremity portion and which is constructed in such a manner that after an inversion of direction caused by the first mechanical stop and a subsequent predetermined movement of the distal extremity portion in the reverse direction, a predetermined holding angle position is maintained between the proximal extremity portion and the distal extremity portion until a holding force of the holding mechanism is overcome by an inertia force of the distal extremity portion connected with a renewed inversion of direction.

4. The dummy object as set forth in claim 3, wherein the holding mechanism comprises a magnetic element.

5. The dummy object as set forth in claim 1, wherein the proximal extremity portion and the distal extremity portion are realized respectively by means of a sandwich structure, which comprises two three-dimensional volume elements and a planar fiber-reinforced material, which is situated between the two three-dimensional volume elements.

6. The dummy object as set forth in claim 5, wherein the planar fiber-reinforced material of the proximal extremity portion forms an overlap with the planar fiber-reinforced material of the distal extremity portion, wherein the two planar fiber-reinforced materials are connected with one another in the associated overlap region by means of a rotary connection.

7. The dummy object as set forth in claim 6, wherein the overlap is situated in a proximal section of the distal extremity portion.

8. The dummy object as set forth in claim 6, wherein the planar fiber-reinforced material of one of the two extremity portions has two end-face sections in the region of the overlap, wherein the planar fiber-reinforced material of the other of the two extremity portions is arranged between the two end-face sections.

9. The dummy object as set forth in claim 1, further comprising
   a form-fitting connection, which connects the proximal extremity portion with a rotor of the drive in a torque-proof manner, wherein the form-fitting connection is not able to receive a tractive force and/or a bending moment along the rotation axis of the drive, and
   an elastic traction device, which engages at the proximal extremity portion and draws the latter against the torso.

10. The dummy object as set forth in claim 9, further comprising
- at least one further extremity, which represents an arm or a leg, wherein the further extremity also comprises a proximal extremity portion, which is mounted in an articulated manner at the torso, and a distal extremity portion, which is mounted in an articulated manner at the proximal extremity portion, and
- at least one further form-fitting connection, which connects the proximal extremity portion of the further extremity with a rotor of the further drive in a torque-proof manner, wherein the further form-fitting connection is not able to receive a tractive force and/or a bending moment along the rotation axis of the further drive, wherein the elastic traction device connects two proximal extremity parts of the dummy object of the same kind, such that the two proximal extremity portions of the dummy object of the same kind are drawn against one another.

11. The dummy object as set forth in claim 1, further comprising a cover, which surrounds at least the torso and the at least one extremity.

12. The dummy object as set forth in claim 11, wherein the cover comprises surface regions which replicate the surface of a human body, in particular the surface of a clothed human body, with regard to their physical noticeability.

13. The dummy object as set forth in claim 1, further comprising
- a connecting device, which is rigidly connected with the torso and which is designed to fasten the dummy object mechanically at a connecting element of an external movement system, by means of which the dummy object is movable.

14. The dummy object as set forth in claim 1, wherein the at least one drive is at least one electric motor, and wherein the dummy object further comprises:
- a control unit for controlling the operation of the at least one electric motor; and
- a wireless receiver device for receiving motor control signals, wherein such motor control signals are indicative of the operation of the electric motor.

* * * * *